United States Patent
Okoshi et al.

(10) Patent No.: US 7,534,827 B2
(45) Date of Patent: May 19, 2009

(54) FLAME-RETARDANT RESIN COMPOSITION AND FLAME-RETARDANT RESIN-MOLDED ARTICLE

(75) Inventors: Masayuki Okoshi, Kanagawa (JP); Kazuya Yamanoi, Kanagawa (JP); Makiko Yamanaka, Kanagawa (JP); Michiaki Yasuno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 228 days.

(21) Appl. No.: 11/505,928

(22) Filed: Aug. 18, 2006

(65) Prior Publication Data

US 2007/0173563 A1    Jul. 26, 2007

(30) Foreign Application Priority Data

Jan. 23, 2006    (JP) ............... 2006-014335

(51) Int. Cl.
  *C08K 3/20*    (2006.01)
  *C08K 3/38*    (2006.01)
(52) U.S. Cl. .......... 524/404; 524/405; 524/262
(58) Field of Classification Search ........ 524/262, 524/404, 405
  See application file for complete search history.

(56) References Cited

U.S. PATENT DOCUMENTS 6,469,095 B1    10/2002    Gareiss et al.

2004/0138378 A1 *   7/2004   Takagi ............... 525/67
2005/0113500 A1 *   5/2005   Okoshi et al. ....... 524/405

FOREIGN PATENT DOCUMENTS

| EP | 1 160 279 A1 | 12/2001 |
| EP | 1 528 083 A1 | 5/2005 |
| EP | 1 695 993 A1 | 8/2006 |
| EP | 1 705 213 A1 | 9/2006 |
| JP | A 5-202280 | 8/1993 |
| JP | A 11-172063 | 6/1999 |
| JP | A 11-343400 | 12/1999 |
| JP | A-2002-285162 | 10/2002 |
| WO | WO 00/00541 | 1/2000 |

OTHER PUBLICATIONS

Masayuki Okoshi. "Processing and Flameretardancy of Novel organic-inorganic Nanocomposite." Doctoral thesis, Kyoto Institute of Technology, No. kou-305, Feb. 18, 2004 (Kyoto Japan).

* cited by examiner

*Primary Examiner*—Kriellion A Sanders
(74) *Attorney, Agent, or Firm*—Oliff & Berridge, PLC

(57) ABSTRACT

According to an aspect of the invention, there is provided a flame-retardant resin composition comprising: a polycarbonate resin; flame-retardant particles that contain a metal hydrate, have thereon a coating layer containing an organic compound or a silicone, and have a volume average particle diameter of about 1 to 500 nm; and a flame-retardant auxiliary.

12 Claims, No Drawings

FLAME-RETARDANT RESIN COMPOSITION AND FLAME-RETARDANT RESIN-MOLDED ARTICLE

BACKGROUND

1. Technical Field

The present invention relates to a flame-retardant resin composition and a flame-retardant resin molded article which contain a resin mixed with flame-retardant particles.

2. Related Art

An external covering material for printers or copying machines requiring flame retardancy is made of blend materials of a polycarbonate (PC) resin/ABS resin, PC resin/polystyrene (PS) resin or the like, wherein a PC resin is used as a major component. Since a PC resin has disadvantages of high costs and poor workability, it is better to increase an ABS resin content in the blend material. In this case, however, it is particularly necessary to impart flame retardancy to the ABS resin.

There are bromine-based agents and phosphorous-based agents as flame retardancy-imparting materials which are principally used at present. However, both of them have an impact on the environment. As flame retardancy-imparting materials having environmental suitability, there are silicone-based materials, metal hydrates, nitrogen-based materials and the like. However, in blend materials of a polycarbonate resin/ABS resin (PS resin), each resin exhibits different selectivity in flame retardancy-imparting materials which can be used, so in practice it is difficult to find a flame retardancy-imparting material that can commonly be used with both the resins.

As flame retardants effective for polycarbonates there are organosiloxanes. As specific examples, (1) a PC copolymerized with a silicone (Example: EXL 9330, trade name, manufactured by GE Corporation) and (2) a PC to which a silicone is added (Example: POLYCA 876-20, trade name, manufactured by Sumitomo Dow SD Corporation) are known.

Also, (3) an ABS flame-retarded with magnesium hydroxide is known. In addition, (4) a material prepared by blending an ABS with a PC flame-retarded with a silicone copolymer (Example: AC 1070, trade name, manufactured by Idemitsu Kosan Corporation) is known.

However, these materials involve the following problems. The material (1) has poor flowability so that molding processability is poor as a covering material. The material (2) has poor flame retardancy stability, and the material (4) exhibits poor humidity stability. The material (3), which contains a metal hydroxide, requires a large amount of a flame retardancy-imparting material to be added in order to obtain flame retardancy, which leads to problems such as the lowering of the mechanical characteristics of the resin and deterioration of moldability.

The present inventors have studied blend materials of a PC flame-retarded with a silicone and a metal hydrate (magnesium hydroxide). As a result, it has been found that the magnesium hydroxide contained in the above-described ABS has a hydroxyl group and thus exhibits alkalinity, whereby the PC is hydrolyzed to cause a foaming phenomenon at the time of kneading the PC with the ABS. Besides, in order to impart flame retardancy to the ABS, it is required to add a large amount of magnesium hydroxide, whereby the kneading load of the resin composition is increased.

SUMMARY

According to an aspect of the invention, there is provided a flame-retardant resin composition comprising: a polycarbonate resin; flame-retardant particles that contain a metal hydrate, have thereon a coating layer containing an organic compound or a silicone, and have a volume average particle diameter of about 1 to 500 nm; and a flame-retardant auxiliary.

DETAILED DESCRIPTION

In the following, the flame-retardant resin composition and the flame-retardant resin molded article of the invention will be described in detail.

<Flame-Retardant Resin Composition>

The flame-retardant resin composition of the invention includes a polycarbonate resin; flame-retardant particles that contain a metal hydrate (hereinafter, referred to as "hydrated metal compound" in some cases), have thereon a coating layer containing an organic compound or a silicone, and have a volume average particle diameter of 1 to 500 nm; and a flame-retardant auxiliary.

As mentioned above, there is a case where a polycarbonate resin foams when it is in contact with an alkaline substance. Although the flame retardant particle used in the flame-retardant resin composition of the invention contains a metal hydrate, which is an alkaline substance, a coating layer containing an organic compound or a silicone is formed on the surface of the flame-retardant particle, and accordingly, the contact of the metal hydrate with the polycarbonate resin may be prevented. Thus, the flame-retardant resin composition of the invention may prevent hydrolysis of the polycarbonate resin and the foaming accompanied therewith.

The "flame-retardant particle(s)" in the invention means such particles that when 5 parts by mass of the particles are added to 100 parts by mass of a polycarbonate resin, the maximum heat generation rate according to ISO5660-1 (which is incorporated herein by reference) can be decreased by 25% or more as compared with the case of the polycarbonate resin prior to the addition of the particles.

In order to achieve the same flame retardancy level as that of organic flame-retardant compounds, a large amount of flame-retardant particles of hydrated metal compounds, which have been conventionally used as flame retardants, have to be added to a matrix resin, so that physical properties of the polymer is remarkably decreased. In this respect, it is required to reduce the amount of the flame retardant to be added in order to prevent deterioration of physical properties of the polymer. A method for reducing the addition amount of the flame retardant is to further pulverize the flame-retardant particles to nanometer-scaled particles, whereby the specific surface area of the particles is increased, resulting in increase in a contact area of the particle with the polymer. As a result, even when the addition amount is small, it becomes possible to obtain flame-retardant performance comparable with that of a conventional halogen-based flame retardant, and further to prevent deterioration of the mechanical physical properties of the resin.

The hydrated metal compound used as the flame retardant reduces the quantity of the generated heat at combustion by thermally decomposing to release water and dilutes the combustion gas released from the polymer at combustion. Although such effects are known to be significant only when the flame retardant is added in a larger amount, such a rule is applicable only to conventional hydrated metal compounds having a micrometer-sized particle diameter.

The inventors of the present invention have found that the hydrated metal compound reduces the quantity of the heat and dilutes the combustion gas released from the polymer at combustion more effectively at finer level when the particle diameter of the flame retardant is reduced to the nanometer order.

When flame retardancy is imparted to a resin by the addition of a flame retardant to the polymer, usually, multiple flame retardants are used in combination. In such a case, the flame retardant used in a larger amount in the resin is the primary flame retardant, and flame retardants added in smaller amounts to enhance the flame-retarding effect of the primary flame retardant are flame-retardant auxiliaries.

For example, a flame-retardant auxiliary for a bromine-based flame retardant is an antimony oxide compound, and the antimony oxide compound, which has reactivity with bromine, enhances the flame retardancy imparted by the primary bromine-based flame retardant at combustion. In such a case, the flame-retardant auxiliary is used for providing an additional synergic effect by combined use with a flame retardant. For example, the flame-retardant auxiliary exerts an endothermic effect by the reaction with the bromine-based flame retardant.

Some flame-retardant auxiliaries are easily carbonized at combustion to cover the surface of the polymer, thereby exhibiting two actions of blocking oxygen as well as blocking the combustible material released from the polymer. Such flame-retardant auxiliaries are called char-forming compounds, and the flame-retarding effects thereof are different from the flame-retarding effect of the hydrated metal compounds.

In the invention, the flame-retarding effect may be improved further by the combination of the two different actions of the hydrated metal compound and the char-forming compound (flame-retardant auxiliary).

Specifically, the improvement of the flame retardancy achieved by use of the combination of a nanometer-sized hydrated metal compound and a char-forming compound is more significant than in the case of the combination of a conventional micrometer-sized hydrated metal compound and a char-forming compound. The combination of a nanometer-sized hydrated metal compound and a char-forming compound has the advantage given by the reduction in the size of the hydrated metal compound to the nanometer order and the effects inherent to the char-forming compound. Further, it is presumed that the hydrated metal compound, which is in the nanometer size, is located very close to the char-forming compound in the polymer to enhance the flame retarding effect.

In the invention, the flame retardant may be the combination of a nanometer-sized metal hydrate and a char-forming flame-retardant auxiliary, which shows the synergetic flame retarding effect. Therefore, the flame-retardant resin composition according to the invention may generate no hazardous gas during combustion and have only a small impact on the environment during recycling.

Hereinafter, the structure or the like of the flame-retardant resin composition of the invention is described.

—Flame-Retardant Particle—

The flame-retardant particles of the invention, which contain a metal hydrate, have a volume average particle diameter of 1 to 500 nm. The volume average particle diameter may be 1 to 200 nm, 5 to 200 nm, 10 to 200 nm, or 10 to 100 nm.

A volume-average particle diameter of the flame-retardant particles of less than 1 nm may lead to reduction of the flame-retardancy-retaining capacity. When the volume-average particle diameter exceeds 500 nm, the particles show property similar to that of commercially available flame-retardant particles having a volume-average particle diameter of 1 μm, and thus addition thereof in a greater amount is necessary for obtaining flame retardancy.

Flame-retardant particles having a volume-average particle diameter in the range as described above are capable of being uniformly dispersed in a polycarbonate resin. In addition, flame-retardant particles having a volume-average particle diameter in the nanometer order may form finer composites, whereby a highly transparent flame-retardant resin composition may be obtained.

The metal hydrate may be a hydrate of at least one metal selected from the group consisting of Mg, Ca, Al, Fe, Zn, Ba, Cu, and Ni. Such metal hydrates are easy to atomize, stable as hydrate, and excellent in heat absorbing property and dehydration reactivity upon heating, and thus exert excellent flame retarding effects. Among the metal hydrates described above, a hydrate of Mg, Al, or Ca may be used.

The metal hydrate is not particularly limited as long as it has a flame-retardant component. Specific examples of the metal hydrate include: metal hydrates such as aluminum hydroxide, magnesium hydroxide, calcium hydroxide, iron hydroxide, zinc hydroxide, copper hydroxide, and nickel hydroxide; hydrates of calcium aluminate, gypsum dihydrate, zinc borate, and barium metaborate; and composite hydrates obtained by combinations of some of the above hydrates. Among the above hydrates, magnesium hydroxide, aluminum hydroxide, and calcium hydroxide may be used.

The metal hydrate may be a composite metal hydrate containing Mg and at least one metal selected from Ca, Al, Fe, Zn, Ba, Cu and Ni. Such a composite metal hydrate of Mg metal and various metals is effective in improving the flame retardancy. For example, the combination of Mg and Ni or Fe dehydrogenates the hydrocarbons derived from resin components vaporized during combustion, thus improving the flame-retarding effects of the resin composition and suppressing smoke generation. The combination of Mg and Al adjusts the water-releasing temperature during combustion, thus improving the flame-retarding effects.

When a metal hydrate containing Mg and at least one metal selected from Ca, Al, Fe, Zn, Ba, Cu and Ni is used, the metal hydrate may be represented by the following Formula (1).

$$MgM_x(OH)_y \qquad \text{Formula (1)}$$

In the formula (1), M represents at least one metal selected from Ca, Al, Fe, Zn, Ba, Cu and Ni; x is a real number of 0.1 to 10; and y is an integer of 2 to 32.

Examples of $MgM_x$ include $MgAl_x$, $MgCa_x$, $MgZn_x$, $MgFe_x$ and $Mg(Al.Ca)_x$.

The flame-retardant particle used in the invention has a coating layer formed thereon. The total light transmittance in the case where the flame-retardant particles are dispersed in toluene may be 70% or more. The total light transmittance in the case where the flame-retardant particles are dispersed in hexane is a rough standard for a surface condition of the flame-retardant particles. When the total light transmittance is 70% or more, it may be said that a surface of the flame-retardant particle is covered sufficiently with the coating layer.

0.1 part by mass of flame-retardant particles is subjected to ultrasonic treatment for 10 minutes in 100 parts by mass of toluene to disperse the flame-retardant particles; and the dispersion solution is placed in a 10 mm square quartz cell to measure a transmittance with respect to linear light having 550 nm wavelength by using a visible light spectrophotometer (trade name: UV-3600, manufactured by Shimadzu Corporation) and the measured value is determined as the total light transmittance.

When a coating layer is formed on the surface of a flame-retardant particle, the dispersibility of the flame-retardant particles may be improved in polycarbonate resin.

A coating layer containing an organic compound or a silicone is formed on the surface of the flame-retardant particle according to the invention.

The organic compound described above is not particularly limited, but may have an organic group capable of binding to the flame-retardant particle. The binding of the organic group enables formation of a uniform organic thin layer on the surface of the flame-retardant particle.

The organic compound may has, at a terminal of the organic group, a binding group for combining with the flame-retardant particle.

Examples of the binding group include a hydroxyl group, a phosphoric acid group, a phosphonium salt group, an amino group, a sulfuric acid group, a sulfonic acid group, a carboxyl group, a hydrophilic heterocyclic group, a polysaccharide group (such as sorbitol, sorbit, sorbitan, sucrose ester, and a sorbitan ester residue), a polyether group (such as a polyoxyalkylene group whose alkylene moiety has 2 to 4 carbon atoms such as polyoxyethylene or polyoxypropylene), a hydrolyzable groups (such as an alkoxy group having 1 to 4 carbon atoms such as methoxy, ethoxy, propoxy, isopropoxy, or butoxy), and a halogen atom (such as bromine or chlorine).

When the binding group is an anionic group (such as sulfuric acid group, sulfonic acid group, or carboxyl group), the binding group may form a salt with a base. Examples of the base include inorganic bases (e.g., an alkali-earth metal such as calcium or magnesium, an alkali metal such as sodium or potassium, and ammonia), and organic bases (e.g., amines). When the binding group is a cationic group (e.g., amino group), the binding group may form a salt with an acid such as an inorganic acid (e.g., hydrochloric acid or sulfuric acid), or an organic acid (e.g., acetic acid). Further, the cationic group may form a salt with an anionic group (in particular, carboxyl or sulfuric acid group). In an embodiment, the binding group has a cationic group and an anionic group.

Thus, examples of the binding groups include ionic groups (anionic groups and cationic groups) and hydrolyzable groups, and the bond between the binding group and the flame-retardant particle may be an ionic or covalent bond.

Examples of the organic group in the organic compound include a group functioning as the hydrophobic group of a surfactant (e.g., a higher fatty acid residue, a higher alcohol residue, or an alkyl-aryl group), and a polyamino acid residue.

Examples of the higher fatty acid residue include a residue of a saturated fatty acid having 8 to 30 carbon atoms (or 10 to 28 carbon atoms, or 12 to 26 carbon atoms) such as lauric acid, myristic acid, palmitic acid, arachic acid, behenic acid, rignoceric acid, cerotic acid, caprylic acid, capric acid, daturic acid, stearic acid, montanic acid, or melissic acid; and a residue of an unsaturated fatty acid having 12 to 30 carbon atoms (or 14 to 28 carbon atoms, or 14 to 26 carbon atoms) such as elaidic acid, linolic acid, linoleic acid, linderic acid, oleic acid, gadoleic acid, erucic acid, or brassidic acid.

Examples of the higher alcohol residue include a higher alcohol residue having 8 to 24 carbon atoms, 10 to 22 carbon atoms, or 12 to 20 carbon atoms, such as octyl, nonyl, dodecyl, tetradecyl, hexadecyl(cetyl), or octadecyl.

Examples of the alkyl-aryl group include a combination of an alkyl group having 1 to 20 carbon atoms and an aryl group having 6 to 18 carbon atoms, a combination of an alkyl having 6 to 18 carbon atoms and an aryl group having 6 to 12 carbon atoms, or a combination of an alkyl group having 6 to 16 carbon atoms and a phenyl group, such as hexylphenyl, octylphenyl, nonylphenyl, decylphenyl, dodecylphenyl, isopropylphenyl, butylphenyl, amylphenyl, and tetradecylphenyl.

These hydrophobic groups may be substituted by various substituents (e.g., alkyl groups having 1 to 4 carbon atoms).

The silicone is not particularly limited as long as it has a siloxane bond, and may be a polymer of a cyclic organosiloxane compound represented by the following formulae (2a) and (2b).

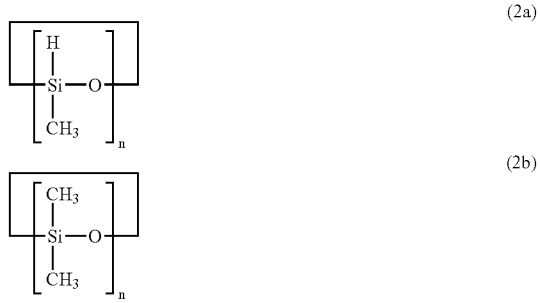

In the formulae (2a) and (2b), n is an integer of 3 to 8. A cyclic organosiloxane having a smaller n has a lower boiling point, and evaporates more easily, whereby the amount of the cyclic organosiloxane adsorbed on the flame-retardant particle is increased. When a cyclic organosiloxane has an n of larger than 7, the cyclic organosiloxane is less volatile and cannot achieve sufficient coating in some cases. When n is 4, 5 or 6, the compound is easy to polymerize owing to their three-dimensional characteristics.

The cyclic organosiloxane compound (2a) or (2b) may be used in the invention. As an alternative, a combination of the cyclic organosiloxane compounds (2a) and (2b) may be used. The polymerization degree (number of repeating units) of the polymer may be in the range of 10 to 1,000, or 10 to 100. In an embodiment, the coating layer includes this polymer and the organic compound described above.

Use of a silicone having a lower surface energy as described above in the coating layer suppresses excessive plasticization of the resin when the flame-retardant particles are mixed with a polycarbonate resin.

In addition, when flame-retardant particles are used in a flame-retardant resin composition, the surface polysilicone layer forms a barrier layer during combustion. During combustion, water released from the metal hydrate particles accelerates foaming of the polysilicone layer (functioning as a barrier layer) provided on the particle surface, thereby improving the heat insulating property of the barrier layer and improving the flame-retarding effects.

In the invention, the amount of the organic compound to be coated on the flame-retardant particles may be in the range of 1 to 200% by mass, 20 to 100% by mass, or 30 to 80% by mass, with respect to the metal hydrate. A coating amount of less than 1% by mass may lead to generation of aggregates in the polycarbonate resin and uneven dispersion state. A coating amount of more than 200% by mass may lead to plasticization of the polycarbonate resin when the particles are dispersed therein.

The amount of the silicone to be coated on the flame-retardant particles may be in the range of 20 to 200% by mass or 20 to 80% by mass, with respect to the metal hydrate. A coating amount of lower than 20% by mass may lead to generation of aggregates in the polycarbonate resin and uneven dispersion state. A coating amount of more than 200% by mass may lead to plasticization of the polycarbonate resin when the particles are dispersed therein.

The uniformity of the coating layer can be confirmed by observing the flame-retardant particles under a transmission electron microscope.

The degree of dispersion of the flame-retardant particles may be in the range of 0.1 to 3.0, 0.1 to 1.0, or 0.1 to 0.8.

A smaller degree of dispersion indicates a narrower particle diameter distribution of the flame-retardant particles, i.e., more uniform distribution in particle size; and the particles having a dispersion degree in the above range give uniform flame retardancy and mechanical properties when dispersed in a resin.

The volume-average particle diameter and the degree of dispersion are determined by using a laser Doppler heterodyne-type particle diameter distribution analyzer (UPA, MICROTRAC-UPA150, manufactured by Nikkiso Co., Ltd.) (Measurements of volume-average particle diameters are conducted in the same manner hereinafter). Specifically, based on the measured particle diameter distribution, a volume weighted cumulative distribution of the particles is plotted against volume from the smaller particle diameter side, and the particle diameter at which the cumulative distribution reaches 50% point is assumed as the volume-average diameter. Similarly, a mass weighted cumulative distribution of the particles is plotted against particle mass from the smaller particle diameter side, and the particle diameter at which the cumulative distribution reaches 90% point is designated as $D_{90}$, and the particle diameter at which the cumulative distribution reaches 10% point is designated as $D_{10}$; the degree of dispersion is defined by the formula below. Dispersion degree values are obtained in a similar manner hereinafter.

Degree of dispersion=$\log(D_{90}/D_{10})$

The method of producing the surface-coated flame-retardant particles according to the invention is not particularly limited if the configuration and the characteristics described above are satisfied. For example, a method can be employed in which metal hydrate particles are dispersed in an aqueous solution containing an organic compound metal salt and a dispersant dissolved therein to form an organic compound layer on the metal hydrate particles. A method can be employed in which a vaporized organic siloxane compound is allowed to contact the surface of metal hydrate particles to form a polysilicone compound layer on the metal hydrate particles. In another method, a metal salt of an alkyl acid is added to an organic solvent to form a reverse micelle, and then the metal ion is converted to a metal oxide to form a surface-coated particle. These methods are detailed in Japanese Patent Application Nos. 2005-49009, 2005-49010 and 2005-49011, the disclosures of which are incorporated by reference herein.

The amount of the flame-retardant particles contained in the flame-retardant resin composition may be 5 to 150 parts by mass or 25 to 100 parts by mass based on 100 parts by mass of the total mass of the polycarbonate resin and the optional ABS resin.

<Flame-Retardant Auxiliary>

The flame-retardant auxiliary usable in the invention is not particularly limited, but may be at least one selected from boric-acid-based flame-retardant auxiliaries, ammonium-based flame-retardant auxiliaries, inorganic flame-retardant auxiliaries, nitrogen-based flame-retardant auxiliaries, organic flame-retardant auxiliaries, and colloidal flame-retardant auxiliaries.

Examples of the boric-acid-based flame-retardant auxiliaries include compounds containing boric acid, such as zinc borate hydrate, barium metaborate, and borax. When using a boric acid containing compound as a flame-retardant auxiliary, alkaline water generated from metal hydrates such as magnesium hydroxide is neutralized with the boric acid of the compound to allow prevention of the foaming of the flame-retardant resin composition of the invention during processing. In addition, since boric acid containing compounds provide a flame-retardant effect, the addition amount of the flame-retardant particles can be reduced.

Examples of the ammonium-based flame-retardant auxiliaries include ammonia compounds such as ammonium sulfate.

Examples of inorganic flame-retardant auxiliaries include iron-oxide-based combustion catalysts such as ferrocene, titanium-containing compounds such as titanium oxide, guanidine compounds such as guanidine sulfamate, zirconium compounds, molybdenum compounds, tin compounds, carbonate salt compounds such as potassium carbonate, metal hydroxides such as aluminum hydroxide and magnesium hydroxide, and modified products thereof.

Examples of the nitrogen-based flame-retardant auxiliaries include cyanurate compounds containing triazine rings.

Examples of organic flame-retardant auxiliaries include chlorendic anhydride, phthalic anhydride, compounds containing bisphenol A, glycidyl compounds such as glycidylether, polyhydric alcohols such as diethylene glycol and pentaerythritol, modified carbamides, silicone oils, and silicone compounds such as organosiloxanes.

Examples of the colloidal flame-retardant auxiliaries include conventionally-used flame retardant metal hydrates such as aluminum hydroxide, magnesium hydroxide, and calcium hydroxide; calcium aluminate, calcium sulfate dihydrate, zinc borate, barium metaborate, borax, hydrates such as kaolin clay, nitrate compound such as sodium nitrate, molybdenum compounds, zirconium compounds, antimony compounds, and flame-retardant colloids such as dawsonite and phlogopite.

Most of the above described flame-retardant auxiliaries are water-soluble or hydrophilic. Only a single flame-retardant auxiliary may be used, or two or more flame-retardant auxiliaries may be used in combination. The flame-retardant auxiliary to be used in the invention may be one or more compounds selected from boric-acid-based flame-retardant auxiliaries, inorganic flame-retardant auxiliaries, nitrogen-based flame-retardant auxiliaries, organic flame-retardant auxiliaries, and colloidal flame-retardant auxiliaries at least because such compounds provide superior flame retardancy even when added in a relatively small amount.

The amount of the flame-retardant auxiliary in the flame-retardant resin composition according to the invention may be in the range of 0.1 to 50 parts by mass or 1 to 35 parts by mass, with respect to 100 parts by mass of the total amount of the polycarbonate resin and the optional ABS resin.

—Polycarbonate Resin—

Types of the polycarbonate resin are not specifically limited, but commercially available resins may be suitably selected and used. There is a polycarbonate resin containing an organosiloxane as a flame retardant among commercially available polycarbonate resins; and such resins may also be used. Furthermore, such polycarbonate resin that is prepared by copolymerizing an alcohol component and dicarboxylic acid component together with a silicone may also be used. A polycarbonate resin containing an organosiloxane is used, whereby the organosiloxane may be allowed to be contained in the flame-retardant resin composition of the invention.

Examples of the polycarbonate resins commercially available include, for example, (1) a polycarbonate resin copolymerized with a silicone (Example: EXL 9330, manufactured by GE Corporation) and (2) a polycarbonate resin to which a silicone is added (Example: POLYCA 876-20, manufactured by Sumitomo Dow SD Corporation).

As a repeating unit for constituting the polycarbonate resin may be the one having (—O—R—OCO—), wherein examples of R-moiety include diphenylpropane, and p-xylene, while —O—R—O is not limited so far as it forms a dioxane compound.

An organosiloxane may be further added to the flame-retardant resin composition of the invention as a flame retardant for the polycarbonate resin. Specific examples of the organosiloxane include, for example, dimethylsilicone, dimethylethyl silicone, diethylsilicone, diphenylsilicone, dimethylphenyl silicone, and diethylphenyl silicone; and dimethylsilicone may be used.

The content of the organosiloxane contained in the flame-retardant resin composition of the invention may be 0.1 to 10 parts by mass, or 0.3 to 6 parts by mass with respect to 100 parts by mass of the total amount of the polycarbonate resin and the optional ABS resin.

—ABS Resin—

An acrylonitrile-butadiene-styrene (ABS) resin may also be used in the flame-retardant resin composition of the invention, wherein the type of the ABS resin is not particularly restricted, but it may be suitably selected from commercially available resins and used. For instance, the ABS resin manufactured by a bulk polymerization method may be used. Since the ABS resin manufactured by bulk polymerization (soap free) does not contain a residue such as an emulsifier and the like, the flame retardancy of the ABS resin itself is improved, resulting in decrease in the amount of flame-retardant particles, a flame-retardant auxiliary and the like to be added. The ABS resin manufactured by bulk polymerization may contain 0.5 part by mass or less of impurities other than the ABS resin with respect to 100 parts by mass of the ABS resin.

In the case of using an ABS resin, the blending amount of the ABS resin may be 10 to 70 parts by mass, or 20 to 60 parts by mass with respect to 100 parts by mass of the polycarbonate resin.

The flame-retardant resin composition according to the invention may further include other commonly-used additives such as a stabilizer. The additives are not particularly limited, and examples thereof include crosslinking agents, crosslinking accelerators, crosslinking acceleration auxiliaries, activators, crosslinking inhibitors, anti-aging agents, antioxidants, antiozonants, ultraviolet absorbents, photostabilizers, tackifiers, plasticizers, softeners, reinforcing agents, toughening agents, expanding agents, expansion auxiliaries, stabilizers, lubricants, mold release agents, antistatic agents, modifying agents, colorants, coupling agents, antiseptics, fungicides, modifiers, adhesives, reodorants, polymerization catalysts, polymerization initiators, polymerization inhibitors, polymerization modifiers, nucleating agents, compatibilizers, dispersants, and antifoams.

Only a single additive may be used, or two or more additives may be used in combination.

In an embodiment, the flame-retardant resin composition according to the invention includes the flame-retardant particles described above and an optional flame-retardant auxiliary, and may further include particles of another (second) flame-retardant compound having a larger particle diameter than the flame-retardant particles. In this embodiment, these flame-retardant substances can be distributed throughout the resin composition (like a stone wall consisting of large and small stones) since, in the polymer matrix, the smaller flame-retardant fine particles fill the gaps between the larger particles. Accordingly, the flame retardancy is further improved.

The particles of the second flame-retardant compound may have a volume-average particle diameter in the range of more than 0.5 μm but 50 μm or less, or in the range of more than 0.5 μm but 30 μm or less. When the volume-average particle diameter is 0.5 μm or less, the particles may be too small to form the above stone wall-like structure. When the volume-average particle diameter is larger than 50 μm, the mechanical characteristics of the polymer may be deteriorated.

The second flame-retardant compound is not particularly limited, and may be at least one compound selected from hydrated metal compounds, inorganic hydrates, nitrogen-containing compounds, and silicon-containing inorganic fillers.

The hydrated metal compound may be a compound selected from aluminum hydroxide, magnesium hydroxide, and calcium hydroxide. The inorganic hydrate may be a compound selected from calcium aluminate, calcium sulfate dihydrate, zinc borate, barium metaborate, borax, and kaolin clay. The nitrogen-containing compound may be sodium nitrate. Further, the silicon-containing inorganic filler may be selected from molybdenum compounds, zirconium compounds, antimony compounds, dawsonite, phlogopite, smectite, and the like.

Only a single compound may be used as the second flame-retardant compound, or a mixture of two or more compounds may be used as the second flame-retardant compound. In addition, the second flame-retardant compound may be the same as or different from the compound constituting the inorganic fine grains to be used in the surface-coated flame-retardant particles.

The content of the particles of the second flame-retardant compound may be in the range of 0.1 to 200 parts by mass, or 0.1 to 50 parts by mass, per 100 parts by mass of the surface-coated flame-retardant particles. When the content of the particles of the second flame-retardant compound is less than 0.1 part by mass, the content is too low to form the above stone wall-like structure. When the content of the particles of the second flame-retardant compound is more than 200 parts by mass, the mechanical characteristics of the polymer are deteriorated owing to the excessively large amount of the second flame-retardant compound.

Another embodiment of the flame-retardant resin composition includes the flame-retardant particles, an optional flame-retardant auxiliary, and a smectite having an organic moiety attached thereto. In this embodiment, the flame-retardant substances are distributed throughout the matrix resin because the gaps between the smectite particles having a larger aspect ratio are filled with the flame-retardant particles which are smaller than the smectite particles. Therefore, the flame retardancy is further improved.

Further, the dispersed smectite having an organic moiety attached thereto does not impair the transparency of the resin, and the flame-retardant particles of the invention are smaller than the wavelength of visible light and are dispersible in the resin uniformly. Accordingly, the resin in the above embodiment is superior in transparency.

The flame-retardant resin composition may be prepared by: mixing the flame-retardant particles, flame-retardant auxiliary, polycarbonate resin, optional ABS resin, and the like; and kneading the mixture by a kneading machine.

The kneading machine is not particularly limited. From the viewpoint of obtaining good dispersion state, the following methods may be used: a method of dispersing the flame-retardant particles in the resin by repetition of shearing stress and agitation by three rolls or two rolls, and a method of dispersing the flame-retardant particles by the collision force upon collision with the sidewall and shearing force, using a kneader, a Banbury mixer, an intermixer, a single-screw extruder, or a twin-screw extruder.

The kneading temperature varies depending on the amount of the polycarbonate resin, the flame-retardant particles to be added, and the like, but may be in the range of 50 to 450° C. or in the range of 60 to 380° C.

The flame-retardant particles according to the invention have a coating layer on their surface. Accordingly, the flame-retardant particles can be dispersed uniformly in the resin not only by mechanical mixing by a kneader, twin-screw extruder, rolls, or the like, but also in a solution wherein the polycarbonate resin is dissolved or swollen.

The flame-retardant particles according to the invention may be mixed with the resin together with a polymerization solvent during the production of the resin by polymerization. Since there is such a high degree of freedom in dispersing the flame-retardant particles in the resin, the flame-retardant resin composition can be applied to a variety of products having various shapes including pellets, fibers, films, sheets, and structural parts.

The organic solvent to be used for the production of the resin by polymerization is not particularly limited, and examples thereof include methanol, ethylformamide, nitromethane, ethanol, acrylic acid, acetonitrile, aniline, cyclohexanol, n-butanol, methylamine, n-amyl alcohol, acetone, methylethylketone, chloroform, benzene, ethyl acetate, toluene, diethylketone, carbon tetrachloride, benzonitrile, cyclohexane, isobutyl chloride, diethylamine, methylcyclohexane, isoamyl acetate, n-octane, n-heptane, isobutyl acetate, isopropyl acetate, methyl isopropyl ketone, butyl acetate, methyl propyl ketone, ethylbenzene, xylene, tetrahydrofuran, trichloroethylene, methyl ethyl ketone, methylene chloride, pyridine, n-hexanol, isopropyl alcohol, dimethylformamide, nitromethane, ethylene glycol, glycerol formamide, dimethylformamide, and dimethylsulfoxide.

Only a single solvent may be used, or two or more solvents may be used.

The mixing temperature during mixing of the flame-retardant particles and the resin may be in the range of 0 to 200° C., in the range of room temperature to 150° C., or in the range of 10 to 100° C. During the mixing, pressure may be applied in accordance with the necessity but the application of pressure is not essential.

In the flame-retardant resin composition after kneading or the above-described solution dispersing, the flame-retardant particles may be homogeneously dispersed as primary particles. The dispersion state may be easily determined by measuring the transmittance of a sheet of the flame-retardant resin composition using ultraviolet and visible light.

The measurement method is such that a solution is prepared by dissolving 10 g of ethylene-vinyl acetate copolymer (trade name: EV260, manufactured by Mitsui Du Pont Corporation) into 100 mL of tetrahydrofuran; 0.5 g of flame-retardant fine particles is dispersed into the resulting solution to obtain a sample solution; the sample solution is cast on a glass base plate and dried at 60° C. for three hours to fabricate a film having 20 μm thickness; and the transmittance of the film is determined by means of an ultraviolet/visible light spectrophotometer.

The transmittance determined by the above-described measurement method may be in the range of 40 to 90%, or in the range of 60 to 90% in 550 nm measurement.

The flame-retardant resin composition according to the invention and the method for production thereof are briefly described so far. The flame-retardant resin composition according to the invention has a high flame retardancy even when only a small amount of flame retardant is added to the resin. This is because the specific surface area of particles and the contact area thereof with polymer (matrix resin) are increased by reducing the particle size of the flame retardant. The flame retardancy may be further improved by additional use of a char-forming flame-retardant auxiliary.

In addition, the flame-retardant particle according to the invention, which has a coating layer (organic compound or silicone) on the surface thereof, may be dispersed more uniformly in the resin and the flame retardancy is further improved.

Further, the flame-retardant resin composition according to the invention is highly flame resistant in the presence of a smaller amount of flame-retardant particles. Therefore, the flame-retardant resin composition of the invention is also superior in mechanical properties, has a smaller impact on the environment than conventional halogen- and phosphoric ester-based flame retardants, and is superior in recycling properties owing to the resistance of the metal hydrate to decomposition by heat history. The flame-retardant particles to be used are not larger in size than the wavelength of visible light and are dispersed uniformly in a matrix resin when added to the resin. Therefore, the flame-retardant resin composition is excellent in transparency.

<Flame-Retardant Resin Molded Article>

The flame-retardant resin molded article of the invention includes a polycarbonate resin, flame-retardant particles that contain a metal hydrate, have thereon a coating layer containing an organic compound or a silicone, and have a volume average particle diameter of 1 to 500 nm, and a flame-retardant auxiliary; and the flame-retardant resin molded article have a flame retardancy of HB or higher according to the UL-94 test. The flame-retardant resin molded article of the invention can be obtained by molding the above-mentioned flame-retardant resin composition by using a molding machine.

One or more molding machines selected from press molding machines, injection molding machines, mold molding machines, blow molding machines, extrusion molding machines, and fiber-spinning molding machines may be used as the molding machines. Thus, the molding may be performed by one of these molding machines, and then molding by other molding machines may be optionally conducted.

The shape of the flame-retardant resin-molded article according to the invention is not particularly limited, and may be, for example, sheet, rod, fiber, or the like. In addition, the size of the flame-retardant resin-molded article is not limited either.

The flame-retardant resin-molded article according to the invention can be used, for example, in the sheet form for packaging materials, building materials, and the like, or as a structural component for OA-device parts such as a frame or internal part for a copying machine, printer, or the like.

The resin composition used in OA-device parts is required to have the following properties. Namely, (1) the resin composition has an antistatic property; (2) it is hardly discolored (turned yellow); (3) it has flame-retardancy that will not be deteriorated, and good recyclability; (4) it has good metallic mold transferring property so that the metallic mold is scarcely stained; (5) it is excellent in abrasion resistance and impact resistance; (6) it can be thinned due to the good flexural modulus; and (7) it has a long life. The flame-retardant resin composition of the invention may satisfy these requirements.

Hereinafter, the advantages of the use of the flame-retardant resin-molded article according to the invention as the OA-device parts will be described.

(Frame)

The flame retardant resin-molded article of the invention, which contains flame-retardant particles of a metal hydrate, does not generate hazardous gases such as halogen gases, dioxins, and cyan during combustion and has a superior flame retardancy. Thus, the resin-molded article may be suitable for a constituent material of a frame, because the thickness of the frame made of the resin-molded article can be reduced owing to its high flame retardancy, high bending modulus and superior molding processability, compared to conventional molded articles. In addition, since the resin composition contains the surface-treated metal hydrate, the surface resistance of the resin composition is reduced, thereby imparting superior antistatic property to the surface of the frame.

Although inorganic or organic phosphorus-based flame retardants have been conventionally used in nonhalogen flame-retardant resin compositions, they are vulnerable to hydrolysis and thus, the resin compositions are often affected by the moisture in the atmosphere and have a short lifetime. In contrast, the flame-retardant resin composition according to the invention is resistant to hydrolysis and heat. Therefore, the flame retardant resin composition of the invention has a longer lifetime and superior recyclability than the conventional nonhalogen flame-retardant resin compositions that contain a phosphorus-based flame retardant. The flame-retardant resin composition of the invention may also be excellent in that it is resistant to discoloration (yellowing) during use, that the deterioration in abrasion resistance during use is prevented, and that it is superior in toner resistance (oil resistance).

(Resin-Molded Articles for Internal Part)

When the flame-retardant resin-molded article of the invention is used as an internal resin-molded article, the internal resin-molded article is superior in dimensional accuracy and in retention of the flame retardancy. Because there are heating units for fusing and fixing toner inside OA devices, the resin parts used therein are required to have heat resistance. In particular when used in areas with higher humidity, the resin composition should have resistance to hydrolysis as well as heat resistance. Since the flame-retardant particles described above are highly resistant to thermal decomposition, resins containing the flame-retardant particles have more stable heat resistance than resins containing other flame retardants. Inorganic or organic phosphorus-based flame retardants, which have been conventionally used in nonhalogen flame-retardant resin compositions, are vulnerable to hydrolysis as described above and disadvantageously shorten the lifetime of the resin compositions. The resin composition according to the invention, which is higher in heat resistance and hydrolysis resistance, and thus superior in dimensional accuracy compared with conventional nonhalogen flame-retardant resin compositions, is favorable for use as a resin-molded article for an internal part.

(ROS Frame)

When the flame-retardant resin-molded article of the invention is used as an ROS frame, the ROS frame is superior in dimensional accuracy. The reason for the superior dimensional accuracy is the same as in the case of the resin-molded article for an internal part. In addition, because the flame-retardant particles have a greater specific surface area, the area of contact with the polymer is larger. Therefore, the interaction between the flame-retardant particles and the polycarbonate resins or the like becomes greater, so that the flame-retardant resin composition according to the invention is less anisotropic when molding, smaller in heat shrinkage ratio, and higher in mechanical strength as well as flame retardancy.

EXAMPLES

In the following, the invention is specifically described with reference to the examples, but it should be noted that the invention is not limited thereto.

(Preparation of Flame-Retardant Particles)

The flame-retardant particles (referred to as "silicone vapor phase treatment" in tables 1 to 3) used in the following examples will be described.

As the flame-retardant particles, 200 g of magnesium hydroxide particles having a volume average particle diameter of 80 nm (trade name: Magnesia 50H, manufactured by Ube Material Industries, Ltd.) and 200 g of octamethylcyclotetrasiloxane as a cyclic organosiloxane compound are weighed in separate glass containers, respectively. These containers are placed in a desiccator which can be depressurized and sealed. Then, the internal pressure of the desiccator is reduced to 80 mmHg by means of a vacuum pump, and thereafter the desiccator is sealed. Then, a treatment is carried out such that the desiccator containing the containers is allowed to stand under the environment of 60° C. for 12 hours. After the treatment, surface-treated (coated) flame-retardant particles (flame-retardant particles) are taken out from the glass container.

The resulting coated flame-retardant particles have a volume average particle diameter of 80 nm, and a degree of dispersion of 0.5. As a result of precisely weighing the coated flame-retardant particles to calculate the coating amount, it is 30% by mass. It is confirmed that the particles are uniformly coated by the observation using a transmission electron microscope (FEI Company Tecnai G2).

Example 1

(Preparation of Flame-Retardant Resin Composition and Flame-Retardant Resin Molded Article)

The flame-retardant particles obtained by the above-mentioned method, a silicone copolymerized polycarbonate (PC) resin (trade name: EXL9330, manufactured by GE Corporation; containing 6% by mass of organosiloxane), ABS resin (trade name: AT-05, manufactured by Nippon A & L Inc.; bulk polymerization product), and zinc borate (trade name: FLAMEBLAEK ZB, manufactured by USBORAX Corporation) as a flame-retardant auxiliary are weighed in the amounts as shown in Table 1, and mixed with each other, and then, the resulting mixture is kneaded by the use of a twin-screw extruder to hot-cut strands, whereby chips of the flame-retardant resin composition are obtained. The resulting chips are molded by a hot press (120° C. for 10 minutes), whereby a sheet-shaped molded article (flame-retardant resin molded article) having a thickness of 2 mm is obtained. There is no foaming in the sheet-shaped molded article prepared by pressing and stranding in the twin-screw extruder.

(Evaluation of Flame-Retardant Resin Molded Article)

With respect to the sheet-shaped molded articles prepared as described above, the following evaluation is made.

Flame Retardancy Test (UL-94)

The flame retardancy test (UL-94) is performed by the vertical combustion test according to JIS Z 2391 (1999) (which is incorporated herein by reference). The test is performed by using a test piece having a thickness of 2 mm. Test pieces which clear the flame retardancy test are classified into V0, V1, V2, and HB, in the order from higher flame retardancy to lower flame retardancy. On the other hand, test pieces which do not clear the test are classified as "rejected". With respect to the test pieces of the evaluation result of HB, the combustion velocity is also determined.

Flame Retardancy Test (Cone Calorimeter)

In the flame retardancy test (cone calorimeter), the relationship between combustion time and heat release rate is determined at a radiation heat of 50 kW/m$^2$ according to the method of ISO 5660 (which is incorporated herein by reference), by using a cone calorimeter (Cone Calorimeter IIIC3, manufactured by Toyo Seiki Seisaku-sho, Ltd.).

Mechanical Strength Test

In the mechanical strength test, the yield stress and the bending modulus of test pieces are determined by using an autograph (V1-C, manufactured by Toyo Seiki Seisaku-sho, Ltd.) according to the method of JIS K7161 (1994) (which is incorporated herein by reference) at normal temperature and a tensile rate of 50 mm/min.

Appearance

The appearance (transparency) is confirmed by visual observation.

Evaluation results are summarized in table 1.

Examples 2 to 9, Comparative Examples 1 to 9

Flame-retardant resin compositions are prepared in the same manner as in example 1, except that the composition is changed as shown in tables 1 to 3; and the resulting products are evaluated in the same manner as in example 1. The evaluation results are summarized in the tables 1 to 3.

In the tables, "KISMA 5A" means magnesium hydroxide (manufactured by Kyowa Chemical Industry Co., Ltd.; volume average particle diameter: 1 μm); "Magnifin HV" means silicone-coated magnesium hydroxide (manufactured by Albemarle Corporation; volume average particle diameter: 1 μm); "500H" means magnesium hydroxide particles having a volume average particle diameter of 80 nm (trade name: Magnesia 500H, manufactured by Ube Material Industries, Ltd.); and "MGZ-3" means magnesium hydroxide having a volume average particle diameter of 200 nm (manufactured by Sakai Chemical Industry Co., Ltd.).

In comparative examples 4, 6, and 9 in which no silicone treatment is carried out, foaming is observed in all the sheet-shaped molded articles prepared by stranding and pressing in a twin-screw extruder. These foamed products are very fragile so that they are crushed and do not maintain their initial stranded shapes by only lightly pressing the products in a stranded state with a hand. Accordingly, the further evaluation is not made, because they are too fragile and thus not suitable for a frame of a copying machine which supports the weight of the copying machine. On the other hand, with respect to the evaluation samples obtained from the magnesium hydroxide coated with silicone, no foaming is observed in sheet-shaped molded articles prepared by stranding and pressing in a twin-screw extruder.

The flame-retardant resin molded article of example 2 is a sheet-shaped molded article prepared by stranding and pressing in a twin-screw extruder using the flame-retardant resin composition wherein 20 parts by mass of flame-retardant particles in example 1 are replaced by 5 parts by mass of the flame-retardant particles and 20 parts by mass of a flame retardant (Magnifin HV). In this case, no foaming is observed during kneading. It is considered that the flame-retardant particles having a volume average particle diameter of 80 nm and the flame retardant having a volume average particle diameter of 1 μm constitute the structure like a stone wall as mentioned above, whereby the mechanical characteristics of the resulting molded article are not deteriorated, and UL-94 V-0 can be achieved.

Next, when the ratio 70:30 of the silicone copolymer PC (EXL9330, manufactured by GE Corporation) to the bulk polymerization ABS (AT-05, manufactured by Nippon A & L Inc.) in example 1 is changed to the ratio 30:70 in example 3, UL-94V level cannot be achieved, and the flame retardancy is decreased to HB level (combustion velocity is 10), so that the flame retardancy is decreased.

In this respect, when 20 parts by mass of the magnesium hydroxide coated with silicone in example 3 are increased to 50 parts by mass of the same in example 4, UL-94 V-0 can be achieved, whereby the flame retardancy is improved.

The ratio 70:30 of the silicone copolymer PC (EXL9330, manufactured by GE Corporation) to the bulk polymerization ABS (AT-05 manufactured by Nippon A & L Inc.) in comparative example 3 is changed to 90:10 in example 5. As a result, HB level turns to UL-94V-1 level even when adding 1 part by mass of the flame-retardant particles and the flame-retardant auxiliary, whereby the flame retardancy is improved remarkably.

Moreover, when increased 5 parts by mass of the magnesium hydroxide coated with silicone are added to the resin composition in example 6, the level turns to V-0 level from V-1, so that the flame retardancy is remarkably improved.

In the meantime, the flame retardancy in example 7 wherein the silicone copolymer PC (silicone copolymer "PC-A" containing 0.1% by mass of organosiloxane) is used is decreased to V-2 level from V-0 level compared to example 1 wherein the silicone copolymer PC (EXL9330, manufactured by GE Corporation; containing 6% by mass of organosiloxane) is used. Hence, 20 parts by mass of the magnesium hydroxide coated with silicone in example 1 are increased to 30% by mass of the same, while 10 parts by mass of zinc borate in example 1 are increased to 20 parts by mass of the same in example 8. As a result, UL -94 V-0 is achieved, so that the flame retardancy is improved.

Furthermore, the flame retardancy in example 9 wherein the silicone copolymer PC (silicone copolymer "PC-B"; containing 10% by mass of organosiloxane) is used is increased remarkably to V-0 level from V-2 level compared to example 7 wherein the silicone copolymer PC (silicone copolymer "PC-A"; containing 0.1% by mass of organosiloxane) is used.

On the other hand, in comparative example 1 wherein the PC containing no silicone (trade name: L-1225Y, manufactured by Teijin Chemicals Ltd.) and the emulsion polymerization ABS (trade name: GA-704, manufactured by Nippon A & L Inc.) are used, the heat generation rate of a cone calorimeter is 580, and the combustion velocity of UL-94HB is 33, and thus, the flame retardancy is inferior. In comparative example 2 wherein the silicone copolymerization PC (trade name: EXL9330, manufactured by GE Corporation) and the emulsion polymerization ABS (trade name: GA-704, manufactured by Nippon A & L Inc.) are used, the heat generation rate of a cone calorimeter is 470, and the combustion velocity of UL-94HB is 15, and thus, the flame retardancy is improved more than that of comparative example 1 in a degree due to the addition of the silicone copolymerization PC. In addition, in comparative example 3 wherein the silicone copolymerization PC (trade name: EXL9330, manufactured by GE Corporation) and the bulk polymerization ABS (trade name: AT-05, manufactured by Nippon A & L Inc.) are used, the heat generation rate of a cone calorimeter is 380, and the combustion velocity of UL-94HB is 0, and thus, the flame retardancy is improved more than that of comparative examples 1 and 2.

TABLE 1

|  |  |  | Example 1 | Example 2 | Example 3 | Example 4 |
|---|---|---|---|---|---|---|
| Polymer (parts by mass) | PC | EXL9330 manufactured by GE Corporation | 70 | 70 | 30 | 30 |
|  |  | L-1225Y manufactured by Teijin Chemicals Ltd. |  |  |  |  |
|  | ABS | AT-05 manufactured by Nippon A & L Inc. (Bulk polymerization Product) | 30 | 30 | 70 | 70 |
|  |  | GA704 manufactured by Nippon A & L Inc. (Emulsion Polymerization Product) |  |  |  |  |
| Flame-retardant Particles (parts by mass) |  | Kisma 5A |  |  |  |  |
|  |  | Magnifin HV 500H |  | 20 |  |  |
|  |  | Silicone Vapor Phase Treatment MGZ-3 | 20 | 5 | 20 | 50 |
| Flame-retardant Auxiliary (parts by mass) | Zinc Borate | USBORAX FLAMEBLAEK ZB | 10 | 10 | 10 | 35 |
|  |  | total (parts by mass) | 130 | 135 | 130 | 185 |
| Flame Retardancy | Cone Calorimeter | Heat Generation Rate (KW/m$^2$) | 180 | 190 | 360 | 200 |
|  | UL-94 | HB (mm/min) | V-0 | V-0 | HB 10 | V-0 |
| Mechanical characteristics | Yield Point Stress | Mpa | 55 | 58 | 58 | 50 |
|  | Flexural Modulus | Gpa | 2.0 | 2.1 | 2.1 | 2.2 |
|  | Appearance |  | Natural | Natural | Natural | Natural |

TABLE 2

|  |  |  | Example 5 | Example 6 | Example 7 | Example 8 | Example 9 |
|---|---|---|---|---|---|---|---|
| Polymer (parts by mass) | PC | EXL9330 manufactured by GE Corporation | 90 | 90 |  |  |  |
|  |  | Silicone Copolymerization PC-A |  |  | 70 | 70 |  |
|  |  | Silicone Copolymerization PC-B |  |  |  |  | 70 |
|  |  | L-1225Y manufactured by Teijin Chemicals Ltd. |  |  |  |  |  |

TABLE 2-continued

|  |  |  | Example 5 | Example 6 | Example 7 | Example 8 | Example 9 |
|---|---|---|---|---|---|---|---|
|  | ABS | AT-05 manufactured by Nippon A & L Inc. (Bulk polymerization Product) | 10 | 10 | 30 | 30 | 30 |
|  |  | GA704 manufactured by Nippon A & L Inc. (Emulsion Polymerization Product) |  |  |  |  |  |
| Flame-retardant Particles (parts by mass) |  | Kisma 5A |  |  |  |  |  |
|  |  | Magnifin HV 500H |  |  |  |  |  |
|  |  | Silicone Vapor Phase Treatment MGZ-3 | 1 | 5 | 20 | 30 | 20 |
| Flame-retardant Auxiliary (parts by mass) | Zinc Borate | USBORAX FLAMEBLAEK ZB | 1 | 1 | 10 | 20 | 10 |
|  |  | total (parts by mass) | 102 | 106 | 130 | 150 | 130 |
| Flame Retardancy | Cone Calorimeter | Heat Generation Rate (KW/m$^2$) | 250 | 190 | 320 | 210 | 180 |
|  | UL-94 |  | V-1 | V-2 | V-2 | V-0 | V-0 |
| Mechanical characteristics | Yield Point Stress | Mpa | 62 | 60 | 55 | 49 | 46 |
|  | Flexural Modulus | Gpa | 1.7 | 1.8 | 1.6 | 1.8 | 1.7 |
|  | Appearance |  | Natural | Natural | Natural | Milky White | Milky White |

TABLE 3

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Polymer (parts by mass) | PC | EXL9330 manufactured by GE Corporation |  | 70 | 70 | 70 | 70 | 70 | 70 | 70 | 70 |
|  |  | L-1225Y manufactured by Teijin Chemicals Ltd. | 70 |  |  |  |  |  |  |  |  |
|  | ABS | AT-05 manufactured by Nippon A & L Inc. (Bulk polymerization Product) |  |  | 30 | 30 | 30 | 30 | 30 | 30 | 30 |
|  |  | GA704 manufactured by Nippon A & L Inc. (Emulsion Polymerization Product) | 30 | 30 |  |  |  |  |  |  |  |
| Flame-retardant Particles (parts by mass) |  | Kisma 5A |  |  |  |  | 20 |  |  |  |  |
|  |  | Magnifin HV 500H |  |  |  |  |  | 20 |  |  |  |
|  |  | Silicone Vapor Phase Treatment MGZ-3 |  |  |  |  |  |  | 20 | 20 |  |
|  |  |  |  |  |  |  |  |  |  |  | 20 |
| Flame-retardant Auxiliary (parts by mass) | Zinc Borate | USBORAX FLAMEBLAEK ZB |  |  |  |  |  |  |  | 10 |  |
|  |  | total (parts by mass) | 100 | 100 | 100 | 120 | 120 | 120 | 120 | 110 | 120 |
| Flame Retardancy | Cone Calorimeter | Heat Generation Rate (KW/m$^2$) | 580 | 470 | 380 | Foamed | 330 | Foamed | 340 | 330 | Foamed |
|  | UL-94 | HB (mm/min) | HB 33 | HB 15 | HB 0 | No Evaluation | V-2 | No Evaluation | V-2 | V-2 | No Evaluation |

TABLE 3-continued

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Mechanical characteristics | Yield Point Stress | Mpa | 49 | 51 | 56 | No Evaluation | 36 | No Evaluation | 58 | 54 | No Evaluation |
|  | Flexural Modulus | Gpa | 1.7 | 1.6 | 1.6 | No Evaluation | 1.7 | No Evaluation | 2.1 | 1.6 | No Evaluation |
|  | Appearance |  | Natural | Natural | Natural | Milky White | Milky White | Milky White | Natural | Natural | Milky White |

From the results obtained, it has been found that in the case where a silicone copolymerization PC resin (example: EXL9330, manufactured by GE Corporation) is used in a flame-retardant resin composition, sufficient flame retardancy is obtained even when a small amount of flame-retardant fine particles is added; and the resulting molded article exhibits also good mechanical characteristics. In addition, it has been found that when magnesium hydroxide having a coating layer is used, it becomes possible to prevent foaming of a PC.

What is claimed is:

1. A flame-retardant resin composition comprising:
   a polycarbonate resin copolymerized with an organosiloxane the content of the organosiloxane in the polycarbonate resin being 6 to 10% by mass;
   flame-retardant particles that contain a metal hydrate, having thereon a coating layer containing an organic compound or a silicone, and having a volume average particle diameter of about 1 to 500 nm; and
   a flame-retardant auxiliary.

2. The flame-retardant resin composition of claim 1, further comprising an acrylonitrile-butadiene-styrene resin.

3. The flame-retardant resin composition of claim 2, wherein the acrylonitrile-butadiene-styrene resin is synthesized by a bulk polymerization method.

4. The flame-retardant resin composition of claim 1, wherein the metal hydrate is a hydrate of at least one metal selected from the group consisting of Mg, Ca, Al, Fe, Zn, Ba, Cu, and Ni.

5. The flame-retardant resin composition of claim 1, wherein the flame-retardant auxiliary is a boric acid-based flame-retardant auxiliary.

6. A flame-retardant resin-molded article comprising:
   a polycarbonate resin copolymerized with an organosiloxane, the content of the organosiloxane in the polycarbonate resin being 6 to 10% by mass;
   flame-retardant particles that contain a metal hydrate, having thereon a coating layer containing an organic compound or a silicone, and having a volume average particle diameter of about 1 to 500 nm; and
   a flame-retardant auxiliary;
   wherein the article has a flame retardancy of HB or more according to the UL-94 test.

7. The flame-retardant resin-molded article of claim 6, further comprising an acrylonitrile-butadiene-styrene resin.

8. The flame-retardant resin-molded article of claim 7, wherein the acrylonitrile-butadiene-styrene resin is synthesized by a bulk polymerization method.

9. The flame-retardant resin-molded article of claim 6, wherein the metal hydrate is a hydrate of at least one metal selected from the group consisting of Mg, Ca, Al, Fe, Zn, Ba, Cu, and Ni.

10. The flame-retardant resin-molded article of claim 6, wherein the flame-retardant auxiliary is a boric acid-based flame-retardant auxiliary.

11. The flame-retardant resin composition of claim 1, wherein the flame -retarding auxiliary is a char-forming compound.

12. The flame-retardant resin-molded article of claim 6, wherein the flame- retarding auxiliary is a char-forming compound.

* * * * *